United States Patent
Malm

[19]

[11] Patent Number: 6,030,020
[45] Date of Patent: Feb. 29, 2000

[54] SEAL OR TRIM MEMBER INCLUDING DESIGN FOR ELIMINATING DISTORTION AT CORNERS

[75] Inventor: Douglas A. Malm, Northville, Mich.

[73] Assignee: The Standard Products Company, Cleveland, Ohio

[21] Appl. No.: 09/123,597

[22] Filed: Jul. 28, 1998

[51] Int. Cl.$^7$ ........................................................ B60J 1/02
[52] U.S. Cl. .................. 296/93; 293/146.15; 52/204.597
[58] Field of Search ................................. 296/93, 146.15, 296/201; 52/208, 204.591, 204.597

[56] References Cited

U.S. PATENT DOCUMENTS

| | | | |
|---|---|---|---|
| 4,358,917 | 11/1982 | Oda et al. ........................... | 52/204.597 |
| 4,787,187 | 11/1988 | Feldmann ........................... | 52/204.597 |
| 4,833,847 | 5/1989 | Inayama et al. . | |
| 4,974,901 | 12/1990 | Katayama . | |
| 5,035,459 | 7/1991 | Yada . | |
| 5,044,684 | 9/1991 | Yada . | |
| 5,193,875 | 3/1993 | Tamura . | |
| 5,233,805 | 8/1993 | Hirai et al. . | |
| 5,248,179 | 9/1993 | Biermacher et al. . | |
| 5,283,100 | 2/1994 | Yui et al. . | |
| 5,344,205 | 9/1994 | Yada et al. . | |
| 5,348,364 | 9/1994 | Yada . | |
| 5,358,764 | 10/1994 | Roberts et al. . | |
| 5,429,844 | 7/1995 | Galardi . | |
| 5,456,049 | 10/1995 | Goto et al. . | |
| 5,771,652 | 6/1998 | Nagata et al. ........................ | 296/93 X |

*Primary Examiner*—Joseph D. Pape
*Attorney, Agent, or Firm*—Harness, Dickey & Pierce, P.L.C.

[57] ABSTRACT

A continuous molding member to be inserted in a gap between a vehicle window and vehicle body panel, where the molding member includes a plurality of independently movable sections that allow the molding member to traverse a corner without becoming distorted. The molding member includes a stem portion having a plurality of barbed extensions at one end and a center umbrella portion at an opposite end. A first side umbrella portion is connected to the stem portion by a first branch portion so that it is positioned on one side of the center umbrella portion, and a second side umbrella portion is connected to the stem portion by a second branch portion so that it is positioned at an opposite side of the center umbrella portion. The first and second branch portions can be of a length so that the first and second side umbrella portions are positioned above the center portion opposite to the stem portion, or below the center portion adjacent to the stem portion. When the molding member traverses a corner, the umbrella portions move relative to each other so that the center umbrella portion becomes closer to the umbrella portion on the inside of the corner and farther away from the umbrella portion on the outside of the corner, thus reducing the distortions to the molding member caused by the reduced radius of the inner corner and the increased radius of the outer corner.

17 Claims, 2 Drawing Sheets

U.S. Patent  Feb. 29, 2000  Sheet 1 of 2  6,030,020
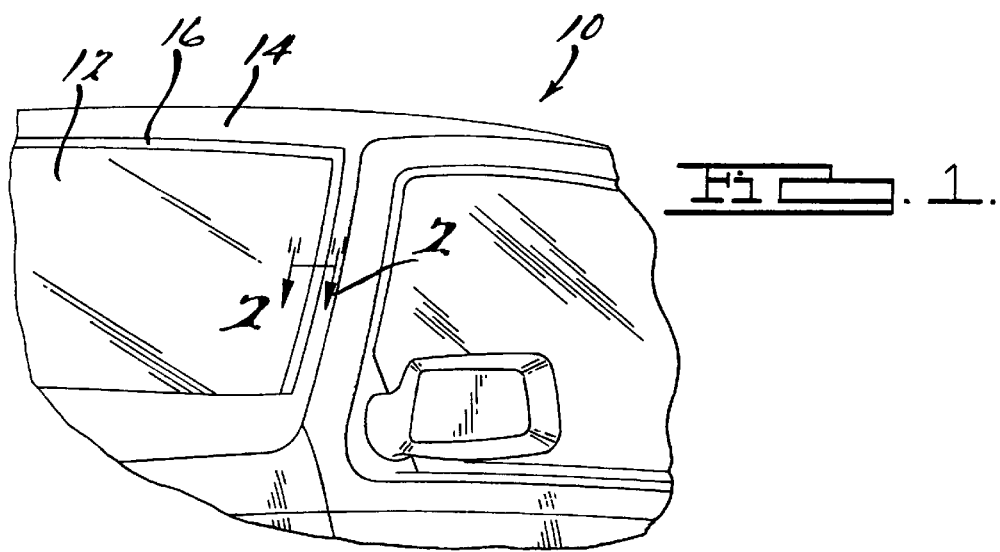
Fig. 1.
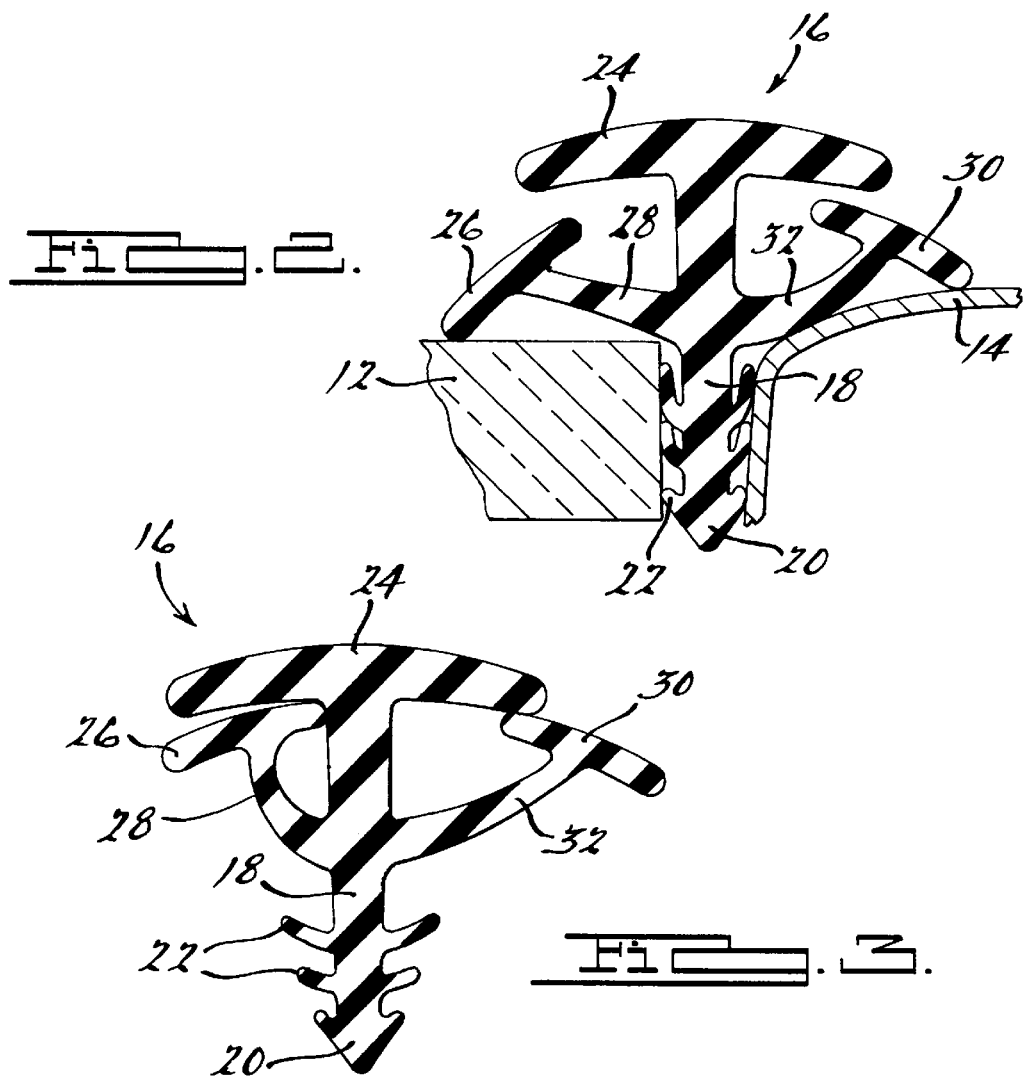
Fig. 2.
Fig. 3.

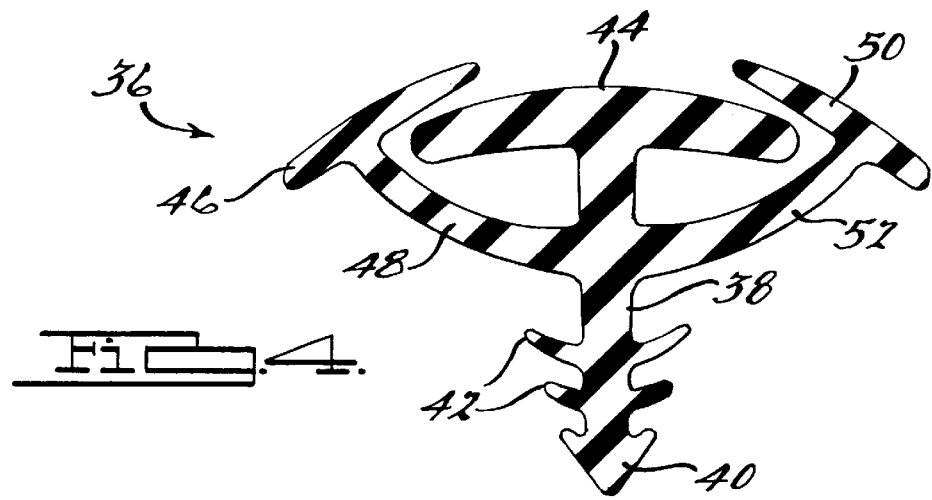
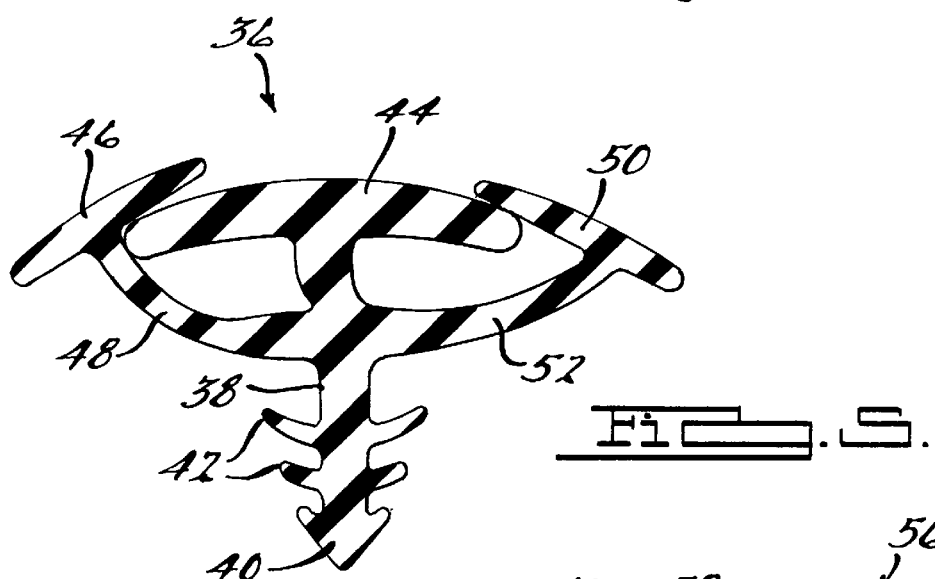
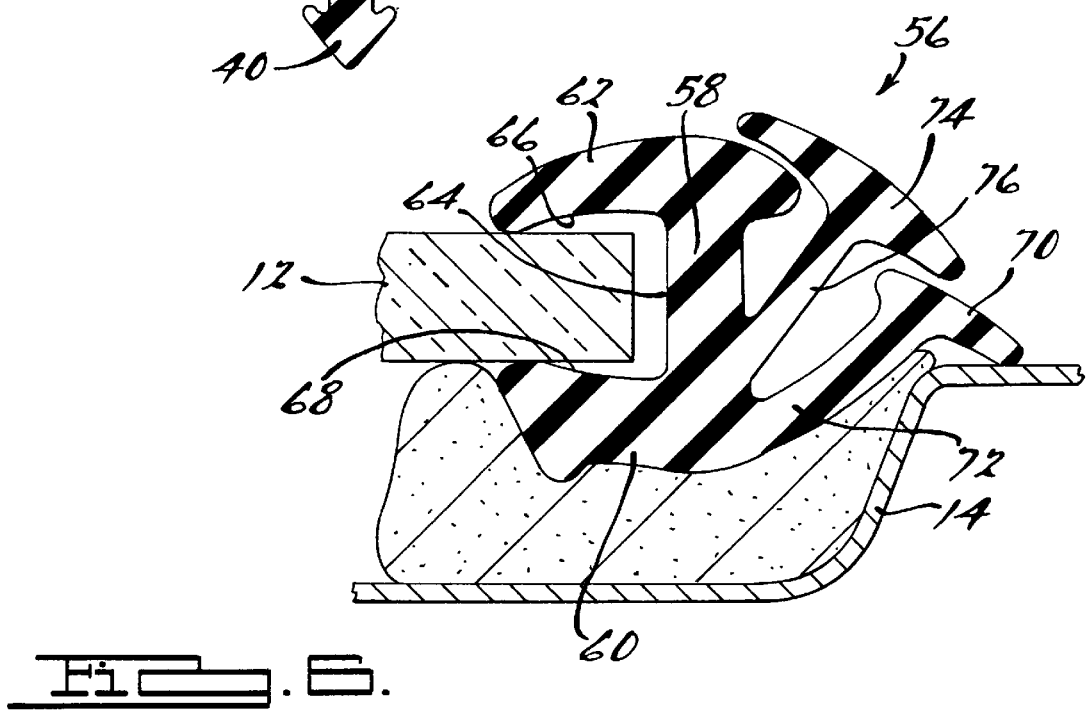

SEAL OR TRIM MEMBER INCLUDING DESIGN FOR ELIMINATING DISTORTION AT CORNERS

BACKGROUND OF THE INVENTION

1. Field of the Invention

This invention relates generally to a trim member and, more particularly, to a vehicle sealing or trim member where the trim member includes an improved design for eliminating or at least reducing distortion when the trim member travels around a corner.

2. Discussion of the Related Art

Vehicles include various sealing, trim or molding members that provide various functions, such as sealing an opening or providing trim so as to make the vehicle more aesthetically pleasing. Typically, members of this type are extruded members made of a thermoplastic, thermoset or synthetic rubber material that forms a flexible, semi-rigid part. In many applications, these members are positioned on the vehicle such that they travel around a corner, or are angled in such a manner that their position on the vehicle is not linear. For example, fixed glass windows, such as windshields and back lights, are commonly mounted within an opening defined by a vehicle body part, such as a sheet metal panel, and a molding is positioned around the window.

Typically, the fixed glass window is positioned within the opening adjacent a vehicle body panel such that a gap or channel is formed around the perimeter of the window to provide tolerance in the relative sizing of the two parts. This channel or gap facilitates installation of the glass to the panel and accommodates differences in expansion between the glass and the body panel. However, the channel or gap is unsightly and provides a place for dirt, water, snow or the like to accumulate. A molding member will typically be mounted within the channel formed between the vehicle body panel and the vehicle windshield or back light as a continuous piece. In this position, the molding member completely travels around the four corners of the window. A closely fit, securely retained and centered molding member is difficult to achieve in practice because the glass and body panel sometimes do not provide coplanar, outwardly facing surfaces on opposite sides of the channel. Additionally, the channel will vary in width around the periphery of the glass making it more difficult to insure a good, tight fit in all places around the periphery.

Because the molding members are generally semi-rigid, thermoplastic continuous pieces, these pieces become distorted at the corners of the window as a result of bending and stretching. Specifically, an inside radius at a corner of the molding member may curl up, buckle, ripple, wrinkle, etc. because too much material is crowded at the inside of the turn. Likewise, the outside radius of the trim member may distort and "cup" as the material tries to move into a smaller turn radius. This distortion at the turn detracts from the appearance of the molding member, making it unsightly, and detracts from the overall purpose of the molding member.

What is needed is an improved design for molding members of this type that compensates for the stresses on an inside and outside radius of the molding member as it travels around a corner. It is therefore an object of the present invention to provide such an improved trim member.

SUMMARY OF THE INVENTION

In accordance with the teachings of the present invention, a continuous molding member is disclosed that includes a plurality of independently movable sections that allow the molding member to traverse a corner without becoming distorted. In a particular embodiment, the molding member includes a stem portion having a plurality of barbed extensions at one end and a center umbrella portion at an opposite end. A first side umbrella portion is connected to the stem portion by a first branch portion so that it is positioned on one side of the center umbrella portion, and a second side umbrella portion is connected to the stem portion by a second branch portion so that it is positioned at an opposite side of the center umbrella portion. The branch portions can be of a length so that the first side and second side umbrella portions are positioned above the center portion opposite to the stem portion, or below the center portion adjacent to the stem portion. When the molding member traverses a corner, the umbrella portions move relative to each other so that the center umbrella portion becomes closer to the umbrella portion on the inside of the corner and farther away from the umbrella portion on the outside of the corner, thus reducing or eliminating the distortions to the molding member caused by the smaller radius of the inner corner and the larger radius of the outer corner.

In alternate embodiments, the three piece umbrella portion design can be configured in different orientations to accommodate different vehicle windows, body panels and molding designs.

Additional objects, advantages and features of the present invention will become apparent from the following description and appended claims, taken in conjunction with the accompanying drawings.

BRIEF DESCRIPTION OF THE DRAWINGS

FIG. 1 is a broken away perspective view of a vehicle windshield and adjacent vehicle body panels, where a molding member, according to an embodiment of the invention, is positioned in a gap between the body panels and the windshield;

FIG. 2 is a cross-sectional view of the vehicle molding according to the present invention through line 2—2 in FIG. 1;

FIG. 3 is a cross-sectional view of the molding member shown in FIG. 2 when it is travelling around a corner separated from the vehicle;

FIG. 4 is a cross-sectional view of a molding member when it is not travelling around a corner, separated from the vehicle according to another embodiment of the present invention;

FIG. 5 is a cross-sectional view of the molding member shown in FIG. 4 when it is travelling around a corner; and FIG. 6 is a cross-sectional view of a molding member in relation to a vehicle window and vehicle body panel according to another embodiment of the present invention.

DETAILED DESCRIPTION OF THE PREFERRED EMBODIMENTS

The following description of the preferred embodiments directed to a vehicle trim or molding member is merely exemplary in nature and is in no way intended to limit the invention or its applications or its uses.

FIG. 1 shows a cut-away perspective view of a vehicle 10 including a vehicle windshield 12 and a vehicle body panel 14. A continuous piece molding member 16, according to an embodiment of the present invention, is positioned in a gap formed between the window 12 and the body panel 14, as is conventional in the art, so that it extends completely around the periphery of the windshield 12. The molding member 16 can be made from any suitable material known in the art, such as a thermoplastic, thermoset or rubber material, by any suitable fabrication process, such as an extrusion process. Polyvinyl chloride is a well known molding material for this application. The molding member 16 is preferably formed as a continuous elongated molding member which can be cut to fit any desired periphery. The durometer of the material forming the molding member 16 is selected to provide a desired level of rigidity and interference fit between the windshield 12 and the vehicle body panel 14, as would be appreciated by those skilled in the art. The use of the molding member 16 between a windshield and vehicle body panel is shown by way of example, in that the molding member 16 can be positioned in other gaps or at other locations on the vehicle.

FIG. 2 is a cross-sectional view of the molding member 16 taken through line 2—2. The molding member 16 includes a stem portion 18 having a barbed tip 20 and a plurality of barbed extensions 22 extending from opposite sides of the stem portion 18 as shown. The barbed extensions 22 are of a sufficient length so as to provide a good tight interference fit when the molding member 16 is positioned in the gap between the windshield 12 and the body panel 14, as is well understood in the art. The molding member 16 further includes a center umbrella portion 24 attached to the stem portion 18 opposite the barbed tip 20. A first side umbrella portion 26 is connected to the stem portion 18 by a first branch portion 28 at a center location along the length of the stem portion 18 just above the barbed extensions 22. A second side umbrella portion 30 is connected to the stem portion 18 by a second branch portion 32 at a center location along the length of the stem portion 18 just above the barbed extensions 22. As will be appreciated by those skilled in the art, the positioning of the umbrella portions 26 and 30 relative to stem portion 18 can be at different locations for different designs, and can be positioned at different locations along the length of the stem portion 18. In the embodiment shown, each of the stem portion 18, the barbed tip 20, the barbed extensions 22, the umbrella portions 24, 26 and 30, and the branch portions 28 and 32 are a single integral unit formed by a continuous extrusion process. However, it is within the scope of the present invention that the separate elements of the molding member 16 can be formed of separate pieces, such as by a co-extrusion process, where some of the pieces may be made of different materials. Additionally, the molding member 16 can include metal inserts and the like for support. Also, the different umbrella portions 24, 26 and 30 can be made of different materials, and can be of different or varying colors or different gloss levels to enhance aesthetics.

As shown in this embodiment, the umbrella portion 24 is positioned above the umbrella portions 26 and 30, where the umbrella portion 24 is slightly larger than the umbrella portions 26 and 30. Of course, the umbrella portions 24, 26 and 30 can be any suitable shape or size for any particular design. In the configuration as shown, the umbrella portions 26 and 30 are free to move towards and away from the stem portion 18 because of the resiliency of the branch portions 28 and 32, and the umbrella portion 24 can be moved towards or away from either of the umbrella portions 26 and 30 because of the resiliency of the stem portion 18. The umbrella portions 26 and 30 can move closer to the stem portion 18 until an interior edge of the umbrella portion 26 or 30 contacts the stem portion 18 below the umbrella portion 24.

It is this flexibility of the umbrella portions 26 and 30 relative to the stem portion 18 and the umbrella portion 24 that compensates for distortions and buckles when the molding member 16 is formed around a corner. This principle is illustrated in FIG. 3, showing a cross-sectional view of the molding member 16 travelling around a corner and separated from the vehicle 10, where a left side of the molding member 16 is the inside of the corner and the right side of the molding member 16 is the outside of the corner. As is apparent from this figure, the shortened radius of the inside corner causes the umbrella portion 26 to move towards the stem portion 18 and/or the umbrella portion 24 to move towards the umbrella portion 26 until an edge of the umbrella portion 26 contacts the stem portion 18 and is positioned under the umbrella portion 24. Likewise, the increased radius of the outside corner causes the umbrella portion 30 to move away from the stem portion 18 and/or the umbrella portion 24 to move away from the umbrella portion 30 such that more of the umbrella portion 30 is exposed adjacent to the umbrella portion 24, as shown. Therefore, instead of the umbrella portion 24 buckling and wrinkling as it travels around a corner as with known designs, the orientation of the three umbrella portions 24, 26, and 30 compensates for the forces from the molding member 16 being bent as discussed.

FIG. 4 shows an alternate design of a molding member 36 that includes a stem portion 38, a barbed tip 40, barbed extensions 42, and a center umbrella portion 44 connected to the stem portion 38 at an end opposite to the barbed tip 40. The member 36 also includes a first side umbrella portion 46 connected to the stem portion 38 above the barbed extensions 42 by a branch portion 48, and a second side umbrella portion 50 connected to the stem portion 38 above the barbed extensions 42 by a branch portion 52. In this design, the branch portions 48 and 52 are long enough so that the umbrella portions 46 and 50 are positioned above the umbrella portion 44, as shown.

FIG. 4 shows the molding member 36 when it is in a free state travelling in a straight or linear direction. FIG. 5 shows the molding member 36 when it is travelling around a corner, where the left side of FIG. 5 is the inside of the corner and the right side of the FIG. 5 is the outside of the corner. As with the embodiment shown in FIG. 3, the umbrella portion 46 moves towards the umbrella portion 44 and/or the umbrella portion 44 moves towards the umbrella portion 46 until the branch portion 48 contacts an edge of the umbrella portion 44. Likewise, the umbrella portion 50 moves away from the umbrella portion 44 and/or the umbrella portion 44 moves away from the umbrella portion 50 so that more of the umbrella portion 44 is exposed on the outside corner. The orientation of the umbrella portions 44, 46 and 50 allow the umbrella portions 46 and 50 to move relative to the umbrella portion 44 to reduce or eliminate distortions from wrinkling and buckling as the molding member 36 travels around the corner.

The three piece umbrella configuration as discussed above can be reconfigured in other molding member designs, and still reduce or eliminate distortion at the corners within the scope of the present invention. FIG. 6 shows a cross-sectional view of a molding member 56 positioned between the windshield 12 and the body panel 14, according to another embodiment of the present invention. In this design, the molding member 56 includes a stem portion 58 that includes an extended portion 60 at one end of the stem portion 58 and a first umbrella portion 62 at an opposite end thereof. The umbrella portion 62 is attached to the stem portion 58 off center so that the combination of the umbrella portion 62, the stem portion 58, and the extended portion 60 defined an opening 64. An edge of the windshield 12 is positioned in the opening 64 such that a bottom surface 66 of the umbrella portion 62 is positioned against a top edge of the windshield 12 and a top surface 68 of the extended portion 60 is positioned against a bottom surface of the edge of the windshield 12.

A second umbrella portion 70 is connected to a bottom location of the stem portion 58 opposite to the extended portion 60 by a lower branch portion 72. Also, a third umbrella portion 74 is positioned between the umbrella portion 62 and the umbrella portion 70, and is connected to the stem portion 58 by a middle branch portion 76. In this orientation, the umbrella portion 74 is positioned above an edge of both the umbrella portions 62 and 70. When the molding member 56 is travelling along a straight portion, the third umbrella portion 74 does not contact either of the umbrella portion 62 or 70, as shown. When the member 56 travels around a corner, the umbrella portion 74 will move towards the windshield 12 and the umbrella portion 62 until an edge of the umbrella portion 62 contacts the branch portion 76 so that more of the umbrella portion 62 is covered by the umbrella portion 56, and more of the umbrella portion 70 is exposed. Thus, the member 56 corrects for distortions at the corners of the glass 12 in the same manner as discussed above.

The foregoing discussion discloses and describes merely exemplary embodiments of the present invention. One skilled in the art will readily recognize from such discussion, and from the accompanying drawings and claims, that various changes, modifications and variations to be made therein without departing from the spirit and scope of the invention as defined in the following claims.

What is claimed is:

1. A molding member comprising:
    an elongated stem portion;
    a first umbrella portion, a second umbrella portion, and a third umbrella portion all connected to the stem portion and being movable independent of each other, wherein one of the first, second or third umbrella portions is connected to one end of the stem portion and the other two of the first, second or third umbrella portions are connected to the stem portion by separate branch portions, and wherein the stem portion, the umbrella portion and the branch portions are elongated members each having a width in a direction opposite to the direction of the elongation, the width of the umbrella portions being wider than the widths of the stem portion and the branch portions, each of the elongated umbrella portions being movable on their respective branch or stem portions relative to each other depending on which direction the molding member is turning.

2. The molding member according to claim 1 wherein the first umbrella portion is positioned between the second and third umbrella portions, and is connected to one end of the stem portion.

3. The molding member according to claim 2 wherein the second umbrella portion is connected to the stem portion by a first branch portion and the third umbrella portion is connected to the stem portion by a second branch portion.

4. The molding member according to claim 3 wherein the first and second branch portions are dimensioned so that the second and third umbrella portions are positioned below the first umbrella portion proximate a location where the first umbrella portion is attached to the stem portion.

5. The molding member according to claim 3 wherein the first and second branch portions have a length so that the second and third umbrella portions are positioned adjacent a top surface of the first umbrella portion opposite to the stem portion.

6. The molding member according to claim 1 wherein the stem portion includes a plurality of barbed extensions.

7. The molding member according to claim 1 wherein the stem portion is configured to be positioned in a gap between a vehicle window and a vehicle body panel.

8. The molding member according to claim 7 wherein a stem portion extension extends from one end of the stem portion and the first umbrella portion is connected to an opposite end of the stem portion, said stem portion, stem portion extension and first umbrella portion defining an opening for accepting an edge of the window.

9. The molding member according to claim 1 wherein the umbrella portion connected to one end of the stem portion has a greater size than the other two umbrella portions.

10. The molding member according to claim 1 wherein the molding member is a single piece extruded member.

11. A molding member for being positioned in a gap between a vehicle window and a vehicle body panel, said molding member being a continuous member formed by an extrusion process, said molding member comprising:
    an elongated stem portion, said stem portion including a plurality of barbed extensions at one end of the stem portion, said stem portion having a width in a direction opposite to the direction of the elongation;
    a first umbrella portion attached to the stem portion at an end opposite to the barbed extensions, said first umbrella portion being an elongated member having a width in a direction opposite to the direction of the elongation, wherein the width of the first umbrella portion is wider than the width of the stem portion;
    a second umbrella portion attached to the stem portion by a first branch portion between the first umbrella portion and the barbed extensions, said first branch portion being an elongated member having a width in a direction opposite to the direction of the elongation, said second umbrella portion being an elongated member having a width in a direction opposite to the direction of the elongation, wherein the width of the second umbrella portion is wider than the width of the first branch portion; and
    a third umbrella portion connected to the stem portion by a second branch portion on an opposite side of the stem portion from the second umbrella portion at a location on the stem portion between the first umbrella portion and the barbed extensions, said second branch portion being an elongated member having a width in a direction opposite to the direction of the elongation, said third umbrella portion being an elongated member having a width in a direction opposite to the direction of the elongation, wherein the width of the third umbrella portion is wider than the width of the second branch portion, wherein the first, second and third umbrella portions are separate members that are independently movable relative to each other.

12. The molding member according to claim 11 wherein the first and second branch portions are dimensioned so that the second and third umbrella portions are positioned below the first umbrella portion proximate a location where the first umbrella portion is attached to the stem portion.

13. The molding member according to claim 11 wherein the first and second branch portions have a length so that the second and third umbrella portions are positioned adjacent a top surface of the first umbrella portion opposite to the stem portion.

14. The molding member according to claim 11 wherein the first umbrella portion is larger in size than the second and third umbrella portions.

15. A molding member for being positioned in a gap between a vehicle window and a vehicle body panel, said molding member being a continuous member formed by an extrusion process, said molding member comprising:

an elongated stem portion, said elongated stem portion including a stem portion extension extending from one end of the stem portion, said stem portion having a width in a direction opposite to the direction of the elongation;

a first umbrella portion attached to the stem portion at an end opposite to the stem portion extension, said first umbrella portion being an elongated member having a width in a direction opposite of the direction of the elongation, wherein the width of the first umbrella portion is wider than the width of the stem portion, said first umbrella portion, said stem portion extension and said stem portion defining an opening that accepts an edge of the vehicle window;

a second umbrella portion attached to the stem portion by a first branch portion between the first umbrella portion and the end of the stem portion that the stem portion extends from, said first branch portion being an elongated member and having a width in a direction opposite to the direction of the elongation, said second umbrella portion being an elongated member having a width in a direction opposite to the direction of the elongation, wherein the width of the second umbrella portion is wider than the width of the first branch portion, said first branch portion extending from a side of the molding member opposite to the stem portion extension; and a third umbrella portion connected to the stem portion by a second branch portion, said second branch portion being an elongated member and having a width in a direction opposite to the direction of the elongation, said third umbrella portion being an elongated member having a width in a direction opposite of the direction of the elongation, wherein the width of the third umbrella portion is wider than the width of the second branch portion, said second branch portion being connected to the stem portion adjacent the end of the stem portion that the stem portion extension extends from, and being on the same side of the molding member as the first branch portion so that the second umbrella portion is positioned between the first umbrella portion and the third umbrella portion, wherein the first, second and third umbrella portions are separate members that are independently movable relative to each other.

16. The molding member according to claim 15 wherein the stem portion and the second branch portion are dimensioned so that the first and third umbrella portions are positioned below the second umbrella portion proximate a location where the second umbrella portion is attached to the first branch portion.

17. The molding member according to claim 15 wherein the first and second branch portions are dimensioned so that the first and third umbrella portions are positioned adjacent a top surface of the second umbrella portion opposite to the first branch portion.

* * * * *